April 5, 1949.    J. B. PARSONS    2,466,326
WINDOW REGULATOR MECHANISM FOR CONVERTIBLES
Filed Sept. 8, 1947
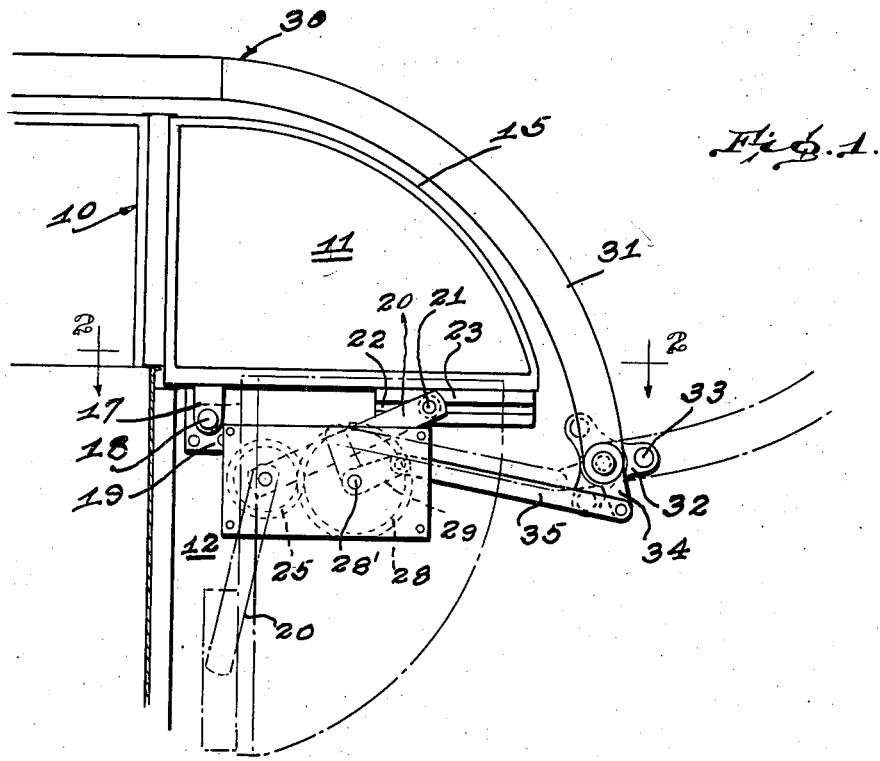
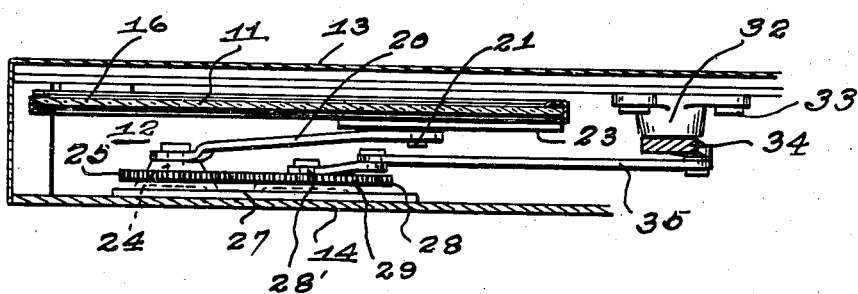
INVENTOR.
John B. Parsons
BY
ATTORNEY Patented Apr. 5, 1949

2,466,326

UNITED STATES PATENT OFFICE 2,466,326

WINDOW REGULATOR MECHANISM FOR CONVERTIBLES

John B. Parsons, Toledo, Ohio, assignor to Malcolm W. Fraser, Toledo, Ohio, trustee Application September 8, 1947, Serial No. 772,853

2 Claims. (Cl. 296—117)

This invention relates to automobiles of the convertible type having a foldable top and a rear quarter window adapted to cooperate with the top and the other windows for completely enclosing the interior of the body.

It is an object of this invention to produce a vehicle body construction of the type described in which the rear quarter window panel is actuated to the open and closed positions by corresponding movement of the top.

More specifically, it is an object to produce a window regulator mechanism for actuating the rear quarter window panel to the open and closed position through an operative connection with the top, so that the top and the window panel are conjointly moved to corresponding positions These and other objects and advantages of this invention will become apparent from the following description and for purposes of illustration but not of limitation, an embodiment of the invention is shown in the accompanying drawings, in which Figure 1 is a fragmentary side elevational view of the rear portion of an automotive body of the convertible type showing the regulator mechanism in position for controlling the movement of the rear quarter window panel, and Figure 2 is a sectional view taken along the line 2—2 of Figure 1.

No useful purpose is served by a raised window panel in the position of a rear quarter window panel of a convertible coupe when the top is folded back, and conversely, it is the ordinary practice to raise the window panel when the top is in the raised or closed position. According to this invention the necessity of constantly raising or lowering the window panel to correspond to the position of the top, is eliminated by providing a window regulator mechanism responsive to the movement of the top for effecting conjoint movement of the window panel and the top.

The features of this invention may be readily understood from the drawings in which 10 indicates an automotive body of the convertible type having a rear quarter window panel 11 positioned over a window well 12 enclosed by outer and inner body panels 13 and 14 respectively.

The window panel 11 is provided with a frame 15 and depending from the forward end portion of the frame is a bracket arm 17 pivoted at its lower end, as at 18, to a bracket plate 19, which is secured to the outer body panel. The window panel is adapted to rock to its closed or raised position, indicated by solid lines in Figure 1, or to its open position in which it is completely concealed within the window well, as indicated by the broken lines.

Swinging or rocking movement is imparted to the window panel by a regulator mechanism having a regulator arm 20 provided with a stud 21 at one end, which is slideable in an elongate slot 22 formed in a retainer 23 fixed to the underside of the channel member 16. The other end of the regulator arm 20 is rigid with a shaft 24 on which is mounted a gear 25. The shaft 24 is rotatable on a mounting plate 27, and rotatably mounted on the plate 27 is a larger gear 28 spaced laterally from but meshing with the gear 25. The gear 28 is rotatable with a shaft 28' and fixed to the shaft 28' for movement therewith is an arm 29.

30 indicates a frame for the folding top (not shown) and includes a rearward curvilinear arm section 31 pivoted at its lower end to a bracket 32 which is secured, as by screws or rivets 33, to the outer body panel. An integral terminal portion 34 of the arm 31 extends beyond the pivotal mounting and is pivotally connected by a link 35 to the free end of the arm 29.

The solid line in Figure 1 illustrates the position of the various parts when the top and window panel 11 are both in the raised position. When the top is folded back upon itself, the arm section 31 rocks in the clockwise direction and through the link 35 swings the arm 29, thereby rotating the gear 28 in a counterclockwise direction. Concomitantly, through the meshing gears, the regulator arm 20 is swung downwardly so that the window panel is swung to its open or concealed position within the window well. These movements take place substantially simultaneously so that the window panel is lowered conjointly with the folding of the collapsible top.

The reverse movements take place as the top is being unfolded or moved to the raised position, that is, with the movement of the top to closed position, the window panel is actuated to raised or closed position. The contour of the panel is selected to engage the edge of the top and the adjacent end walls of the other windows to enable complete enclosure of the interior.

It is to be understood that the regulator mechanism may be readily adapted for actuation from a direct connection with the arm section 31 and to operate in a similar fashion on one or more window panels at the same time.

It is to be further understood that numerous changes in the details of construction, arrangement and operation may be effected without departing from the spirit of the invention, especially as defined in the following claims.

What I claim is:

1. In an automotive body having both a collapsible top and a window panel mounted for movement to the open and closed position, a window regulator mechanism operative for moving a window panel to the open and closed position in response to corresponding movement of the top, said mechanism comprising a pivotally mounted regulator arm operatively connected at one end to the window panel and adapted to actuate the latter to open and closed position in response to pivotal movement, and a driving connection between the collapsible top and said arm operative to actuate the latter for pivotal movement in response to movement of the top, said driving connection comprising a gear rigid with said arm and positioned for rotational movement in the same plane, and link means operatively connecting the top with the gear for rotating the latter in response to movement of the top.

2. In an automotive body having both a collapsible top and a window panel mounted for movement to the open and closed position, a window regulator mechanism operative for moving a window panel to the open and closed position in response to corresponding movement of the top, said mechanism comprising a pivotally mounted regulator arm operatively connected at one end to the window panel and adapted to actuate the latter to open and closed position in response to pivotal movement, and a driving connection between the collapsible top and said arm operative to actuate the latter for pivotal movement in response to movement of the top, said driving connection comprising a pair of meshing gears, one of which is rigid with said arm and rotatable therewith, and a link operatively connecting the latter gear with the top so that movement of the top is transmitted therethrough to the gears and the regulator arm.

JOHN B. PARSONS.

REFERENCES CITED

The following references are of record in the file of this patent:

UNITED STATES PATENTS

| Number | Name | Date |
|---|---|---|
| 1,940,444 | Burgman | Dec. 19, 1933 |
| 2,045,344 | Deutsch et al | June 23, 1936 |
| 2,134,784 | Goalwin | Nov. 1, 1938 |
| 2,267,471 | Keller | Dec. 23, 1941 |

FOREIGN PATENTS

| Number | Country | Date |
|---|---|---|
| 420,866 | Great Britain | Dec. 10, 1934 |